United States Patent
Osawa et al.

(10) Patent No.: US 8,192,290 B2
(45) Date of Patent: Jun. 5, 2012

(54) SHRINK-FIT TOOL UNIT AS WELL AS TOOL HOLDER AND ROTARY TOOL TO BE USED FOR THE SHRINK-FIT TOOL UNIT

(75) Inventors: Jiro Osawa, Toyokawa (JP); Takayuki Matsushita, Toyokawa (JP)

(73) Assignee: OSG Corporation, Aichi (JP)

( * ) Notice: Subject to any disclaimer, the term of this patent is extended or adjusted under 35 U.S.C. 154(b) by 912 days.

(21) Appl. No.: 12/086,653

(22) PCT Filed: Jan. 25, 2006

(86) PCT No.: PCT/JP2006/301118
§ 371 (c)(1),
(2), (4) Date: Aug. 29, 2008

(87) PCT Pub. No.: WO2007/086112
PCT Pub. Date: Aug. 2, 2007

(65) Prior Publication Data
US 2009/0011844 A1    Jan. 8, 2009

(51) Int. Cl.
*B21J 13/02* (2006.01)
(52) U.S. Cl. .......................... 470/198; 29/447
(58) Field of Classification Search .......... 470/198, 470/204; 408/219, 220, 222; 29/447; 279/102
See application file for complete search history.

(56) References Cited

U.S. PATENT DOCUMENTS

| | | | | |
|---|---|---|---|---|
| 2,242,305 A * | 5/1941 | Koehler et al. | | 279/49 |
| 2,325,627 A * | 7/1943 | Neilson | | 408/200 |
| 5,992,860 A * | 11/1999 | Marquart | | 279/102 |
| 6,217,267 B1 * | 4/2001 | Sugano et al. | | 408/222 |
| 6,339,868 B1 * | 1/2002 | Nagaya et al. | | 29/447 |
| 6,345,942 B1 * | 2/2002 | Cook | | 409/131 |
| 6,588,083 B2 * | 7/2003 | Voss et al. | | 29/407.08 |
| 6,685,573 B2 * | 2/2004 | Hikosaka et al. | | 470/204 |
| 7,390,153 B2 * | 6/2008 | Gruber | | 409/234 |
| 2003/0075879 A1 | 4/2003 | Lundblad et al. | | |

FOREIGN PATENT DOCUMENTS

| | | |
|---|---|---|
| EP | 1 029 620 A2 | 8/2000 |
| JP | 1982-181537 | 11/1982 |
| JP | 10-138047 | 5/1998 |
| JP | 2000-198006 | 7/2000 |
| JP | 2002-355727 | 12/2002 |
| JP | 2003-127027 | 5/2003 |
| JP | 2003-517940 | 6/2003 |

* cited by examiner

*Primary Examiner* — Edward Tolan
(74) *Attorney, Agent, or Firm* — Muramatsu & Associates

(57) ABSTRACT

A shrink-fit tool unit increases the transmission force of rotary power and also improves workability when inserting the rotary tool into the tool holder. A tool holder and a rotary tool to be used for the shrink-fit tool unit are also disclosed. Since a first engaging part and a second engaging part are configured to engage with each other simply by inserting a cylindrical terminal area of a rotary tool, typically, a thread forming tap, into a chuck of the tool holder, even when the machining load receiving from a work piece act both in forward and reverse directions relative to the circumferential direction, it is possible to increase the transmission of rotary power.

5 Claims, 11 Drawing Sheets

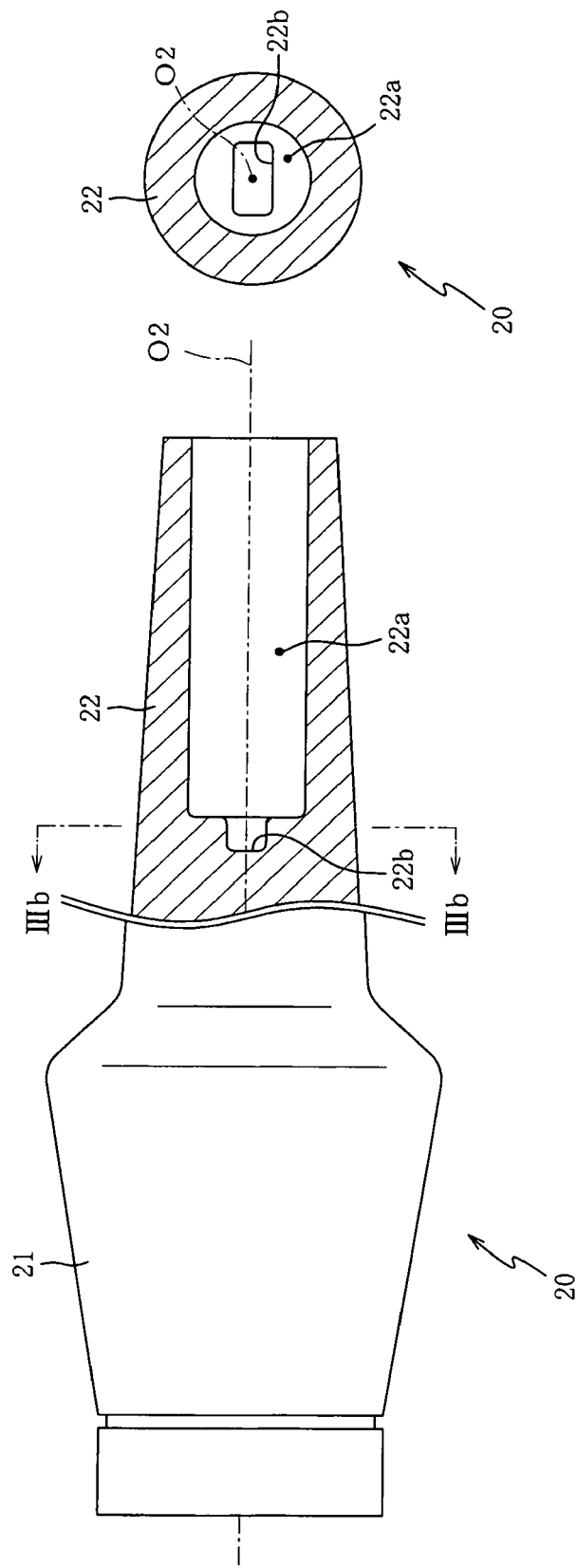

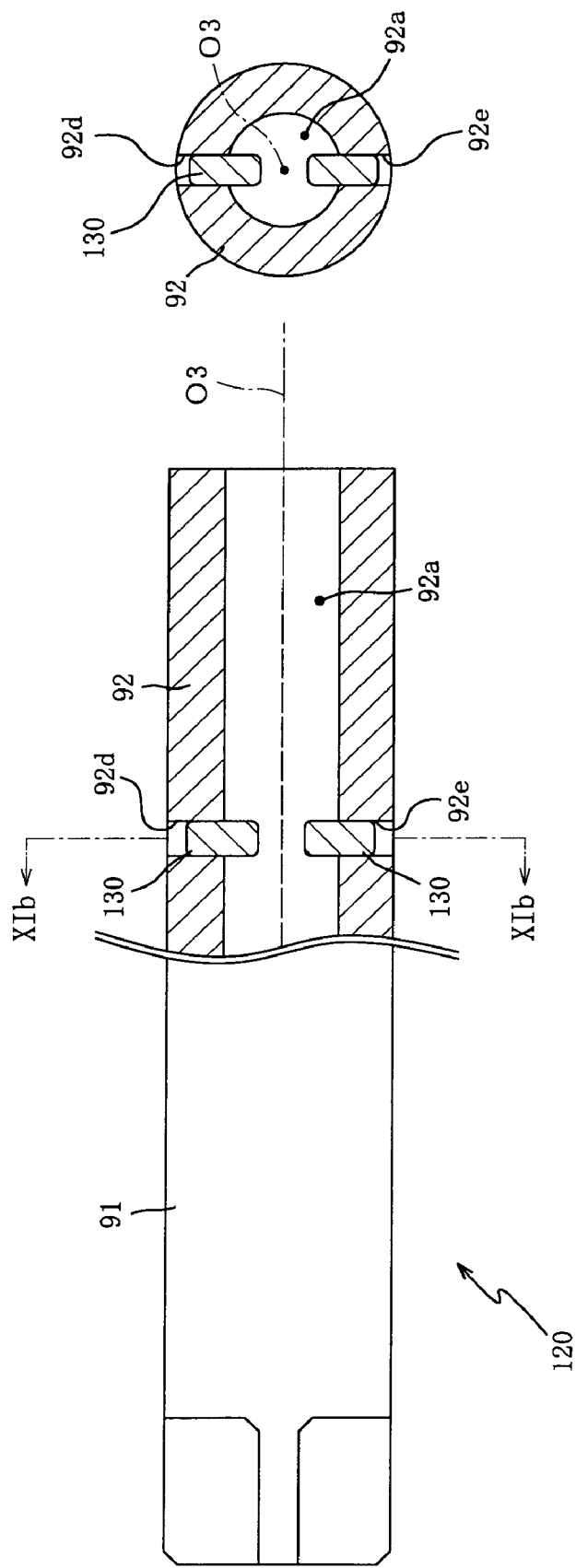

US 8,192,290 B2

SHRINK-FIT TOOL UNIT AS WELL AS TOOL HOLDER AND ROTARY TOOL TO BE USED FOR THE SHRINK-FIT TOOL UNIT

TECHNICAL FIELD

The present invention relates to shrink-fit tool units as well as tool holders and rotary tools to be used for the shrink-fit tool units, and more specifically to a shrink-fit tool unit as well as a tool holder and a rotary tool to be used for the shrink-fit tool unit, which is capable of increasing the transmission of rotary power and also improving the workability when inserting the rotary tool into the tool holder.

BACKGROUND ART

Conventionally, a shrink-fit tool unit is used in order to increase the sway precision of a rotary tool for machining. The shrink-fit tool unit includes a tool holder having a chuck in which a cylindrical terminal area of a rotary tool can be inserted, and holds the rotary tool by shrink-fit of the cylindrical terminal area with the chuck of the tool holder so as to transmit the rotary power to the rotary tool.

With this shrink-fit tool unit, it is possible to not only increase the gripping force of the rotary tool but also increase the sway precision in machining by minimizing the deflection of the rotary tool to be held, as compared with the case when the rotary tool is only pinched.

However, when machining load receiving from a work piece is large or, for example, when there is a constraint that the diameter of the cylindrical terminal area must be smaller than the root diameter of the cutting portion, such as for a tap, a sufficient gripping force cannot be obtained only with shrink-fit and consequently a slip is caused between the rotary and the tool holder.

To address this problem, in Japanese Patent Application Laid-Open Publication No. 2002-355727 for example, a shrink-fit tool unit is disclosed that includes a lock pin to restrain the rotation of the rotary tool held in the tool holder relative to the tool holder and thereby allows the rotary tool to be rigidly held without causing a slip between the rotary tool and the tool holder even when the machining load receiving from a work piece is large.

DISCLOSURE OF THE INVENTION

Problem to be Solved by the Invention

However, with the conventional shrink-fit tool unit described above, since the rotary tool is engaged with the lock pin while rotating the rotary tool in a circumferential direction relative to the tool holder after inserting the cylindrical terminal area of the rotary tool into the chuck of the tool holder, if the machining load receiving from the work piece is large in both forward and reverse directions, for a thread forming tap to form an internal thread by plastic-deforming a work piece, for example, the restraining force cannot be obtained for the machining load in either of the forward or reverse direction, and as a result a slip is caused between the rotary tool and the tool holder and thereby the rotary power cannot be transmitted.

Also, since the lock pin is disposed at a position which is offset relative to the axis of the rotary tool, the circumferential relative position between the rotary tool and the tool holder is determined by the lock pin, which makes it necessary to check the insert direction each time the rotary tool is inserted into the tool holder, thus resulting in a problem of poor workability.

The present invention has been made to solve the problems described above and has an object of providing the shrink-fit tool unit capable of increasing the transmission force of rotary power and also improving workability when inserting the rotary tool into the tool holder, as well as the tool holder and the rotary tool to be used for the shrink-fit tool unit.

Means for Solving the Problem

For achieving the object, the first aspect of the present invention is a shrink-fit tool unit which has a rotary tool having a cylindrical terminal area which is formed in a cylindrical shape having an axis and a tool holder having a chuck in which a columnar hollow section is disposed in the hollow and the cylindrical terminal area of the rotary tool can be inserted in, the rotary tool being maintained in the tool holder by shrink-fitting the cylindrical terminal area of the rotary tool into the chuck of the tool holder, where: the rotary tool is a thread forming tap including a cutting part provided at the end of the cylindrical terminal area and has a margin section projecting radially to form an internal thread by plastic-deforming a work piece; the cylindrical terminal area has a first engaging part which is formed on the side of the cylindrical terminal area with a shape of approximately rectangle as seen from the axis of the cylindrical terminal area; the first engaging part is disposed symmetrically relative to the axis of the cylindrical terminal area by matching a center thereof with the axis of the cylindrical terminal area, and each sides of the rectangle shape is lengthened to the direction which the margin projects; the tool holder has a second engaging part that is formed in the chuck and engages with the first engaging part; the second engaging part is formed approximately rectangle shape as seen from an axis of the chuck to engage with the first engaging part and is disposed symmetrically relative to the axis of the chuck; and the relative rotation of the rotary tool held in the tool holder is restricted with respect to the tool holder, even the machining load receiving from a workpiece act both in forward and reverse circumferential directions, by engaging the first engaging part and the second engaging part with each other when the cylindrical terminal area of the rotary tool is inserted in the chuck.

According to the second aspect of the present invention, in addition to the shrink-fit tool unit according to the first aspect noted above, a section between the cylindrical terminal area and the cutting part is formed so that it is radially enlarged in the direction from the cylindrical terminal area to the cutting part, the cylindrical terminal area of the rotary tool is shrink-fitted to the chuck of the tool holder while the cutting part is not in contact with the chuck; the first engaging part is a projection convexly formed on the side of the cylindrical terminal area and the second engaging part is a concave groove concavely formed on the back end of hollow section; and the bottom of the concave groove of the second engaging part is formed so that it contacts with the projection of the first engaging part.

According to the third aspect of the present invention, in addition to the shrink-fit tool unit according to the first aspect noted above, a section between the cylindrical terminal area and the cutting part is formed so that it is radially enlarged in the direction from the cylindrical terminal area to the cutting part; the cylindrical terminal area of the rotary tool is shrink-fitted to the chuck of the tool holder while the cutting part is not in contact with the chuck; the first engaging part is a engaging groove concavely formed on the side of the cylindrical terminal area and the second engaging part is an axial member undetachably fixed in the chuck and being inserted in holes formed in the chuck and are penetrating the outside and the hollow section of the chuck and are formed symmetrically to each other relative to the axis of the chuck; and the bottom of the engaging groove of the first engaging part is formed so that it contacts with the axial member of the second engaging part.

According to the fourth aspect of the present invention, in addition to the shrink-fit tool unit according to the first aspect noted above, the first engaging part is a projection convexly formed on the side of the cylindrical terminal area and the second engaging part is an engaging screw spirally inserted in the holes which are formed in the chuck and are penetrating the outside and the hollow section of the chuck and are symmetrical to each other relative to the axis of the chuck; the engaging screws are disposed perpendicular to the axis of the chuck and pinch the projection symmetrically relative to the axis of the chuck.

According to the fifth aspect, in addition to the shrink-fit tool unit according to the first aspect noted above, the tool holder is held on the machining tool by means of a collet.

The sixth aspect of the present invention is a tool holder to be used in the shrink-fit tool unit according to any one of the aspects mentioned above.

The seventh aspect of the present invention is a thread forming tap to be used in the shrink-fit tool unit according to any one of the aspects mentioned above.

EFFECT OF THE INVENTION

According to the shrink-fit tool unit in the first aspect of the present invention, since the cylindrical terminal area of the thread forming tap, by which a work piece is formed into an internal thread by plastic-deforming the work piece and therefore the machining load receiving from the work piece is especially large and also the machining load acts both in forward and reverse circumferential directions, has a first engaging part and the chuck of the tool holder has a second engaging part that engages with the first engaging part, when the cylindrical terminal area is inserted into the chuck of the tool holder to hold the thread forming tap in the tool holder, the first and second engaging parts engage with each other and thereby the rotation of the thread forming tap relative to the tool holder is constrained. As a result, even when the machining load receiving from a work piece is large, it is possible to securely hold the thread forming tap without causing a slip relative to the tool holder.

Furthermore, since this shrink-fit tool unit is configured so that the first and second engaging parts engage with each other simply by inserting the cylindrical terminal area into the chuck of the tool holder, even when the machining load receiving from a work piece act in both forward and reverse circumferential directions, no slip is caused between the thread forming tap and the tool holder and thereby the transmission efficiency of the rotary power is increased.

Another advantage is that, since the first engaging part is provided axially symmetrically relative to the axis of the cylindrical terminal area, as compared with the case where it is provided at a position that is offset relative to the axis for example, the direction of inserting the thread forming tap into the chuck of the tool holder is not limited to only one direction, but can be inserted at least two directions, thus improving the workability.

In addition, since the first engaging part is provided axially symmetrically relative to the axis of the cylindrical terminal area, the construction of the thread forming tap and the tool holder can be simplified and thereby the manufacturing cost thereof can be reduced.

Also, by disposing the first engaging part on the side surface of the cylindrical terminal area of the thread forming tap, it is possible to increase the shrink-fit area, i.e, the area where the thread forming tap and the tool holder are shrink-fitted, namely a shrink-fit area, as compared with the case where the first engaging part is provided on the cylindrical terminal area of the thread forming tap, thereby increasing the grip force of the tool holder for the thread forming tap.

With the shrink-fit tool unit in the second aspect, in addition to the advantage of the shrink-fit tool unit in the first aspect noted above, the contact area between the first engaging part and the second engaging part increases, therefore the thread forming tap is securely held, and thus it is possible to prevent the slip between the thread forming tap and the tool holder.

With the shrink-fit tool unit in the third aspect, in addition to the advantage of the shrink-fit tool unit in the first aspect noted above, the contact area between the first engaging part and the second engaging part increases, therefore the thread forming tap is securely held, and thus it is possible to prevent the slip between the thread forming tap and the tool holder.

With the shrink-fit tool unit in the fourth aspect, in addition to the advantage of the shrink-fit tool unit in the first aspect noted above, it is possible to curb the rattling of the thread forming tap in a circumference direction with respect to the tool holder by fixing the engaging screws detachably after shrink-fitting the cylindrical terminal area of the thread forming tap.

With the shrink-fit tool unit in the fifth aspect, in addition to the advantage of the shrink-fit tool unit in the first to fourth aspects noted above, it is possible to reduce the tool cost by forming only the end of a cutting part with hard metal or the like.

With the tool holder in the sixth aspect of the present invention, it is possible to have similar advantages of the tool holders used for the shrink-fit tool units in the first to fifth aspects noted above.

With the thread forming tap in the seventh aspect of the present invention, it is possible to have similar advantages of the thread forming tap used for the shrink-fit tool units in the first to fifth aspects mentioned above.

BRIEF DESCRIPTION OF THE DRAWINGS

FIG. 3A is a front view of the tool holder and FIG. 3B is a cross-sectional view of the tool holder taken along the IIIb-IIIb line in FIG. 3A.

FIG. 11A is a front view of the tool holder and FIG. 11B is a cross-sectional view thereof taken along the XIb-XIb line in FIG. 11A.

Figure 1:
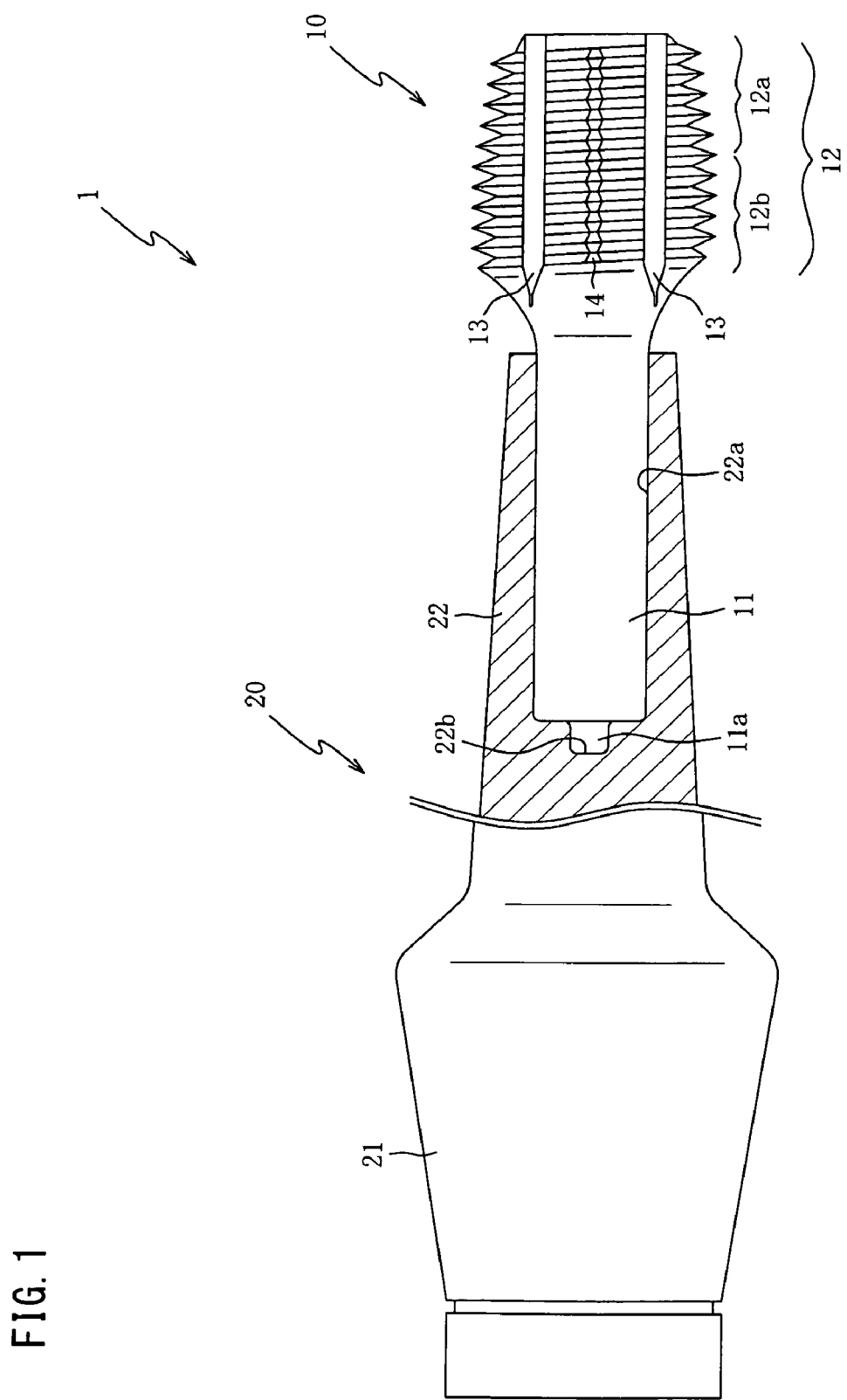
FIG. 1 is a front view of the shrink-fit tool unit according to a first embodiment of the present invention.

DESCRIPTION OF REFERENCE NUMERALS 1, 30, 70, 110 Shrink-fit tool unit
10, 40, 80 Roll tap (rotary tool, thread forming tap)
11 Cylindrical terminal area
11a First engaging part
11b, 11c Engaging groove (first engaging part)
20, 50, 90, 120 Tool holder
22, 92 Chuck
22a, 92a Hollow part (a part of the chuck)
22b Second engaging part
60, 100 Engaging pin (second engaging part)
130 Engaging screw (second engaging part)
O1 Axis of cylindrical terminal area

BEST MODE FOR CARRYING OUT THE INVENTION

With reference to the accompanying drawings, preferred embodiments of the present invention will be described below. First, the entire configuration of a shrink-fit tool unit 1 is outlined with reference to FIG. 1. FIG. 1 is a front view of the shrink-fit tool unit 1 according to a first embodiment of the present invention. Also, FIG. 1 shows the state where a thread forming tap 10 is held in a tool holder 20. In FIG. 1, a part of the tool holder 20 is cross-sectioned and the length in the shaft direction is roughly shown.

The shrink-fit tool unit 1 includes the thread forming tap 10 and the tool holder 20, wherein the thread forming tap 10 is held in the tool holder 20 by shrink-fitting the cylindrical terminal area 11 of the thread forming tap 10 to the chuck 22 of the tool holder 20. In the shrink-fit tool unit 1, it is possible to restrict the relative rotation of the thread forming tap 10 with respect to the tool holder 20 by engaging a first engaging part 11a with a second engaging part 22b.

Figures 2A, 2B:
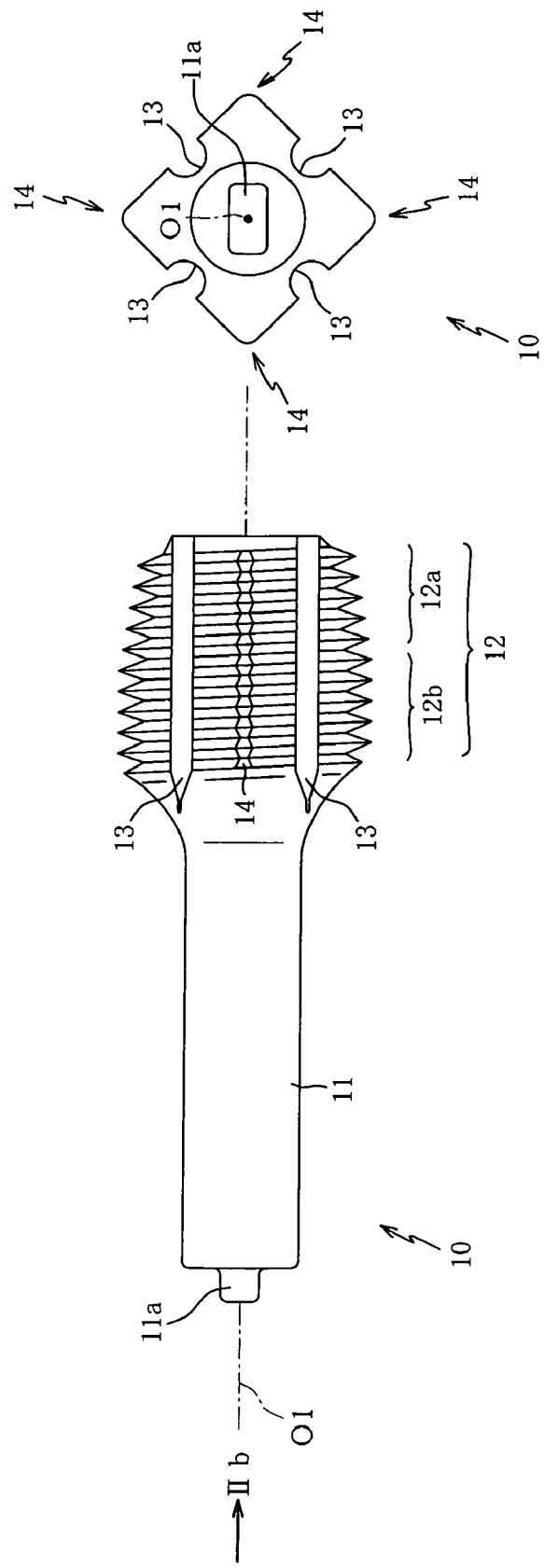
FIG. 2A is a front view of the thread forming tap and FIG. 2B is a side view of the thread forming tap as seen from the arrow IIb direction in FIG. 2A.

Next, the detailed configuration of the thread forming tap 10 is described with reference to FIGS. 2A and 2B. FIG. 2A is a front view of the thread forming tap 10 and FIG. 2B is a side view of the thread forming tap 10 as seen from the arrow IIb direction.

The thread forming tap 10 includes the cylindrical terminal area 11 and a cutting part 12 provided at the end (on the right side in FIG. 2A) of the cylindrical terminal area 11, wherein an internal thread is formed in a pilot hole (not shown) of a work piece by giving a rotation drive of a machining tool (not shown) to the cylindrical terminal area 11 through the tool holder 20, as shown in FIG. 1.

The cylindrical terminal area 11 is a part to maintain the thread forming tap 10 in the tool holder 20 by shrink-fitting with the chuck 22 (described below) in the tool holder 20 as shown in FIG. 1, and is made of high-speed tool steel and is formed in a cylindrical shape having an axis O1. The first engaging part 11a is convexly formed on the side (the left side in FIG. 2A) of the cylindrical terminal area 11. The cylindrical terminal area 11 may be made of hard metal instead of high-speed tool steel.

The first engaging part 11a is a part to restrict the relative rotation of the thread forming tap 10 with respect to the tool holder 20 by engaging the first engaging part 11a with the second engaging part 22b (described below) of the tool holder 20 (refer to FIG. 1), and, as shown in FIGS. 2A-2B, is formed in a columnar projection which is approximately rectangle as seen from the front and the side, and is disposed symmetrically relative to the axis O1 by matching the center thereof with the axis O1.

The cutting part 12 is a part to roll-form an internal thread by threading into the pilot hole of a work piece and includes a bevel lead 12a and a whole heap 12b. On the peripheral surface of the cutting part 12, an oil groove 13 is concavely formed in approximately parallel to the axis O1, and the cutting part 12 has a margin section 14 projecting radially.

The bevel lead 12a is a part to lead the cutting part 12 into the pilot hole of a work piece, and is tapered so that the outer diameter decreases toward the end (on the right side in FIG. 2A) of the cutting part 12.

The whole heap 12b is a part to finish the internal thread roll-formed by the bevel lead 12a, and is formed in approximately the same shape as the shape of an internal thread to be roll-formed in the pilot hole of the work piece.

The oil groove 13 is a part to supply tapping oil to the pilot hole of a work piece, and is extending from the bevel lead 12a to the whole heap 12b and is formed in approximately linearly. The oil groove 13 may not be required to extend from the bevel lead 12a to the whole heap 12b but it may be provided only at a part of the cutting part 12. Also, it need not be formed linearly but may be formed spirally.

The margin section 14 is a part to roll-form an internal thread by leading into the pilot hole of a work piece to plastic-deform the work piece, and formed in approximately parallel to the axis O1.

Next, the detailed configuration of the tool holder 20 is described with reference to FIGS. 3A and 3B. FIG. 3A is a front view of the tool holder 20 and FIG. 3B is a cross-sectional view of the tool holder 20 taken along the IIIb-IIIb line in FIG. 3A. In FIG. 3A, a part of the tool holder 20 is cross-sectioned and the axially length is roughly shown.

The tool holder 20, as shown FIGS. 3A and 3B, includes a shank 21 and the chuck 22 coupled to the shank 21, and is to hold the shank 21 onto the machining tool and also to transmit a rotary power of the machining tool to the thread forming tap 10 by maintaining the thread forming tap 10 in the chuck 22.

The shank 21 is a part to hold the tool holder 20 onto the machining tool and, as shown in FIG. 3A, is formed conically having the axis O2.

The chuck 22 is a part to hold the thread forming tap 10 by shrink-fit and, as shown in FIG. 3A, is tapered so that the outer diameter thereof decreases toward the end (on the right side in FIG. 3A) in order to prevent interference with a work piece. Also, the chuck 22 has a hollow section 22a with the same axis as the axis O2, and the second engaging part 22b is concavely formed on the back end (on the left side in FIG. 3A) of the hollow section 22a.

The hollow section 22a is a part to receive the cylindrical terminal area 11 of the thread forming tap 10 (refer to FIG. 1), and is formed with the diameter smaller than that of the cylindrical terminal area 11 of the thread forming tap 10 at a normal temperature. When the chuck 22 is heated, the diameter thereof is increased due to heat expansion and thereby the cylindrical terminal area 11 of the thread forming tap 10 can be inserted therein. On the other hand, when the chuck 22 is cooled with the cylindrical terminal area 11 of the thread forming tap 10 being inserted, the diameter thereof is decreased due to heat contraction and thereby the thread forming tap 10 can be maintained undetachably in the tool holder 20.

The second engaging part 22b is a part to restrict the relative rotation of the thread forming tap 10 with respect to the tool holder 20 by engaging with the first engaging part 11a of the thread forming tap 10 (refer to FIG. 1) and, as shown in FIGS. 3A and 3B, is formed as a concave groove that engages with the first engaging part 11a and also is disposed symmetrically relative to the axis O2 by matching the center thereof with the axis O2.

Here, to engage the second engaging part 22b with the first engaging part 11a of the thread forming tap 10, they can be easily engaged with each other simply by inserting the thread forming tap 10 while rotating it at approximately 180 degrees.

With the shrink-fit tool unit 1 as configured above, since the cylindrical terminal area 11 of the thread forming tap 10 has the first engaging part 11a and the chuck 22 (hollow section 22a) of the tool holder 20 has the second engaging part 22b to engage with the first engaging part 11a, when the cylindrical terminal area 11 of the thread forming tap 10 is inserted into the chuck 22 (hollow section 22a) of the tool holder 20 in order to maintain the thread forming tap 10 in the tool holder 20, the first engaging part 11a and the second engaging part 22b are engaged with each other to restrict the relative rotation of the thread forming tap 10 with respect to the tool holder 20. As a result, even when the machining load receiving from a work piece is large, it is possible to maintain the thread forming tap 10 securely without causing a slip between the thread forming tap 10 and the tool holder 20.

Also, since the first engaging part 11a and the second engaging part 22b are configured to engage with each other simply by inserting the cylindrical terminal area 11 of the thread forming tap 10 into the chuck 22 (hollow section 22a) of the tool holder 20, even when the machining load receiving from a work piece act both in forward and reverse circumferential directions, it is possible to increase the transmission of rotary power without causing a slip between the thread forming tap 10 and the tool holder 20.

Furthermore, since the first engaging part 11a of the thread forming tap 10 is disposed axissymetrically relative to the axis O1 of the cylindrical terminal area 11, as compared with a case where it is disposed at an offset position relative to the axis O1, for example, the direction of inserting the thread forming tap 10 into the chuck 22 (hollow section 22a) of the tool holder 20 is not limited to one direction, but at least two directions are possible and thereby workability can be improved.

Also, since the first engaging part 11a of the thread forming tap 10 is disposed symmetrically relative to the axis O1 of the cylindrical terminal area 11, the configuration of the thread forming tap 10 and the tool holder 20 can be simplified and thereby the manufacture cost can be reduced.

In addition, with this embodiment, since the first engaging part 11a is provided on the side of the cylindrical terminal area 11 of the thread forming tap 10, the area where the thread forming tap 10 and the tool holder 20 are shrink-fitted can be increased as compared with a case where the first engaging part 11a is disposed on the cylindrical terminal area 11 of the thread forming tap 10, and thereby the grip force of the tool holder 20 for the thread forming tap 10 can be strengthened.

When an internal thread is formed by plastic-deforming a work piece, the machining load of the thread forming tap 10 receiving from the work piece is large and, the machining load acts in both forward and reverse directions. Even in such a situation, the thread forming tap 10 is securely maintained without causing a slip relative to the tool holder 20, thus making it possible to increase the transmission of rotary power effectively.

Now, the roll-form test for roll-forming an internal thread in the pilot hole of a work piece with the shrink-fit tool unit 1 having the abovementioned configuration will be described. The roll-form test is a test to measure the cutting torque generated in the thread forming tap 10 during the roll-forming.

The roll-form test was made using the shrink-fit tool unit 1 described in this embodiment (hereinafter called "the present invention") and a shrink-fit tool unit that does not have the first engaging part 11a and the second engaging part 22b (hereinafter called a conventional product). Both of the present invention and the conventional product have the nominal diameter of the cutting part of 14.0 mm and the pitch of 2.0 mm, and a thread forming tap with the diameter of the cylindrical terminal area of 10.5 mm was used and the shrink-fit is performed with the exposed thread between the thread forming tap and the tool holder of 0.015 mm.

According to the result of the roll-form test, the conventional product caused a slip between the thread forming tap and the tool holder when the cutting torque reached 77 Nm. In contrast, the present invention did not cause a slip between the thread forming tap 10 and the tool holder 20 and consequently it was possible to form an internal thread in the pilot hole of the work piece.

Next, a shrink-fit tool unit 30 of a second embodiment will be described with reference to FIG. 4. The shrink-fit tool unit 1 of the first embodiment is configured so that the relative rotation of the thread forming tap 10 with respect to the tool holder 20 is restricted by engaging the first engaging part 11a that is convexly formed on the thread forming tap 10 with the second engaging part 22b that is concavely formed on the tool holder 20. In contrast, the shrink-fit tool unit 30 of the second embodiment is configured so that the relative rotation of the thread forming tap 40 with respect to the tool holder 50 is restricted by engaging an engaging groove 11b that is concavely formed on the thread forming tap 40 with an engaging pin 60 disposed on the tool holder 50. The same sections as those in the first embodiment are denoted by the same numerals and not described.

Figure 4:
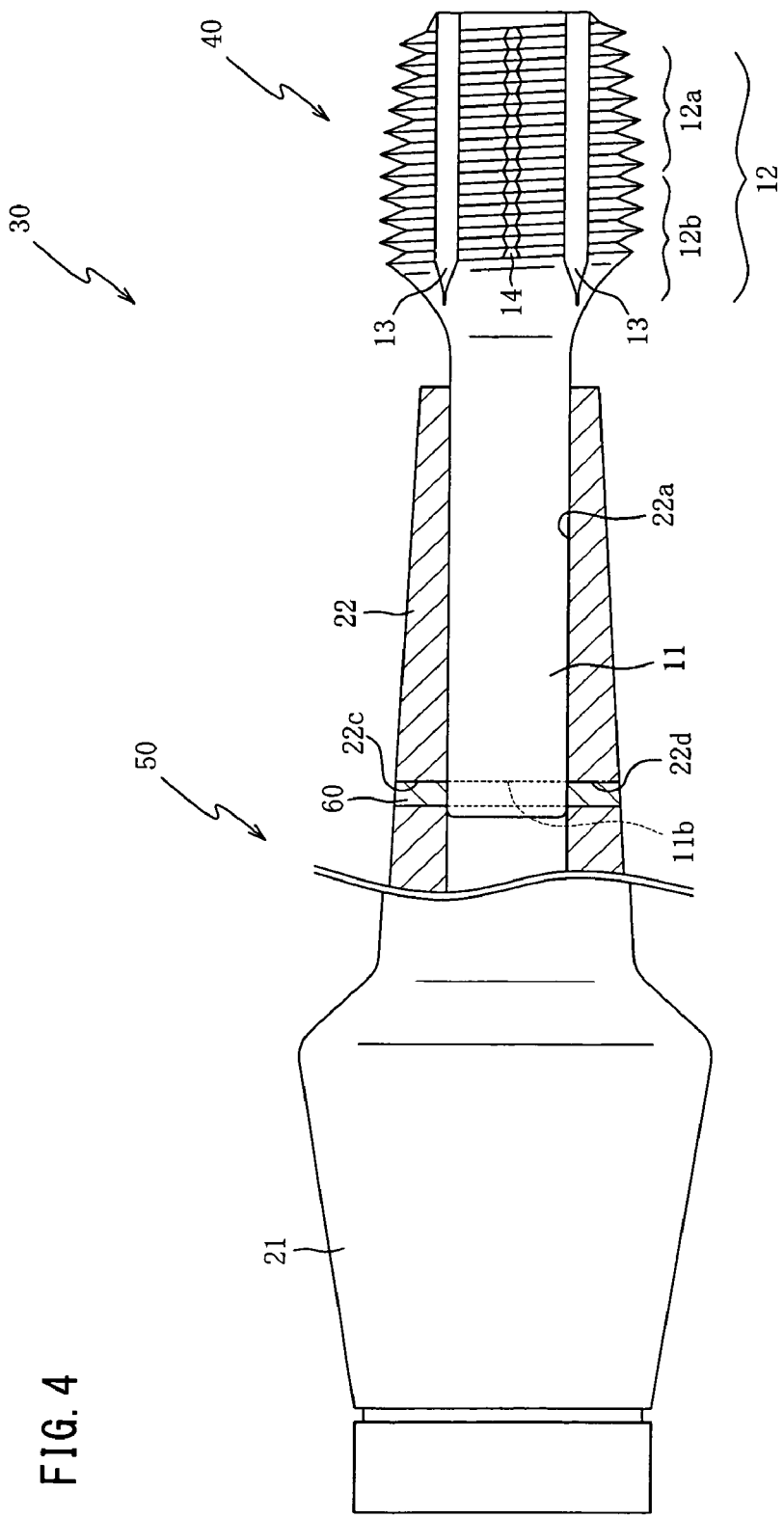
FIG. 4 is a front view of the shrink-fit tool unit according to a second embodiment of the present invention.

FIG. 4 is a front view of the shrink-fit tool unit 30 according to the second embodiment of the present invention. Also, FIG. 4 shows the state where the thread forming tap 40 is maintained in the tool holder 50. In FIG. 4, a part of the tool holder 50 is cross-sectioned and the length in the axial direction is roughly shown.

The shrink-fit tool unit 30, as shown in FIG. 4, includes the thread forming tap 40 and the tool holder 50, wherein the thread forming tap 40 is maintained in the tool holder 50 by shrink-fitting the cylindrical terminal area 11 of the thread forming tap 40 into the tool holder 50, and also the relative rotation of the thread forming tap 40 can be control restricted with respect to the tool holder 50.

Figures 5A, 5B:
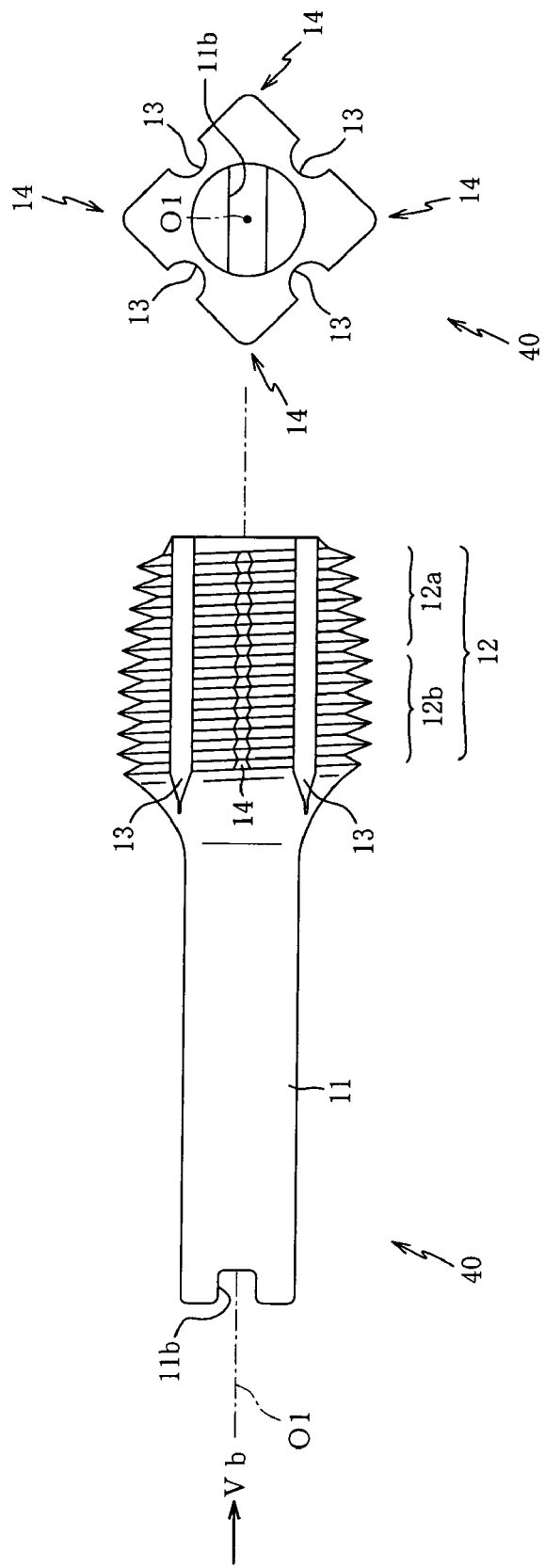
FIG. 5A is a front view of the thread forming tap and FIG. 5B is a side view of the thread forming tap as seen from the arrow Vb direction in FIG. 5A.

Now, the detailed configuration of the thread forming tap 40 will be described with reference to FIGS. 5A and 5B. FIG. 5A is a front view of the thread forming tap 40 and FIG. 5B is a side view of the thread forming tap 40 as seen from the arrow Vb direction.

The thread forming tap 40 is a tool to form an internal thread in the pilot hole (not shown) of a work piece by providing a rotary power of the machining tool (not shown) to the cylindrical terminal area 11 through the tool holder 50 and, as shown in FIGS. 5A and 5B, the engaging groove 11b is concavely formed on the side (on the left side in FIG. 5A) of the cylindrical terminal area 11.

The engaging groove 11b is a part to restrict the relative rotation of the thread forming tap 40 with respect to the tool holder 50 by engaging with the engaging pin 60 of the tool holder 50 described below and, as shown in FIGS. 5A and 5B, is concavely formed in an approximate rectangle shape as seen from the front and the side, and also is disposed axissymetrically relative to the axis O1 by matching the center thereof with the axis O1.

Figures 6A, 6B:
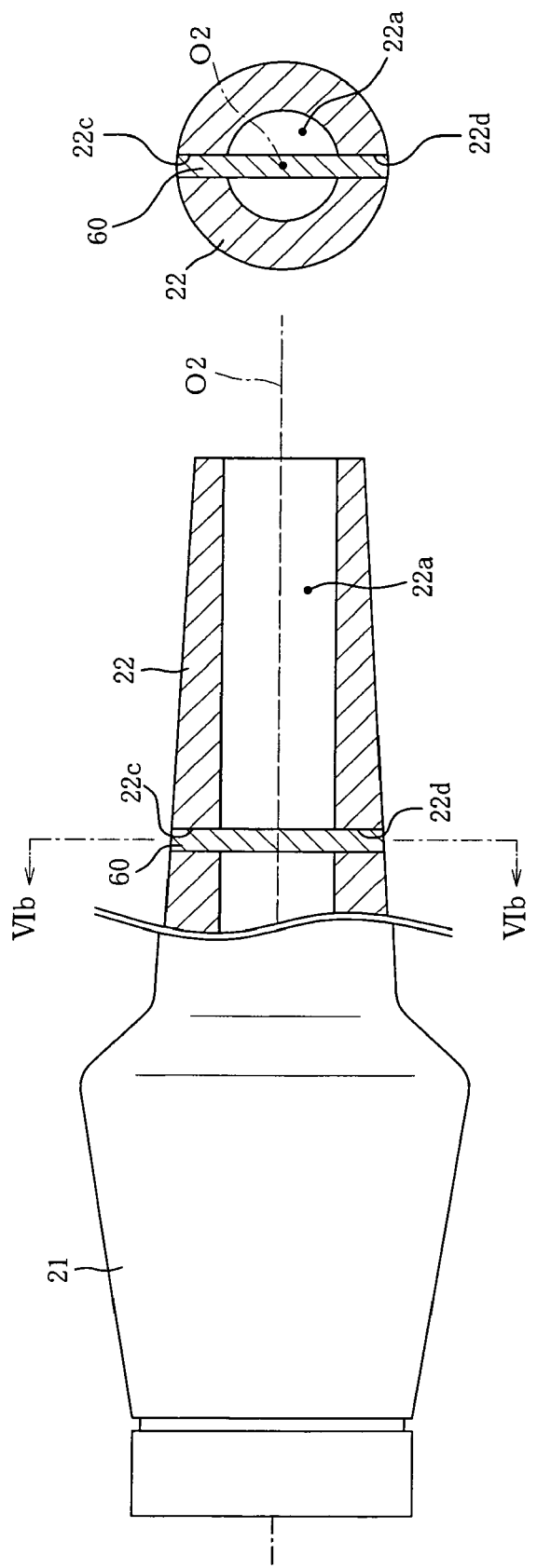
FIG. 6A is a front view of the tool holder and FIG. 6B is a cross-sectional view of the tool holder taken along the VIb-VIb line in FIG. 6A.

Next, the detailed configuration of the tool holder 50 will be described with reference to FIGS. 6A and 6B. FIG. 6A is a front view of the tool holder 50 and FIG. 6B is a cross-sectional view of the tool holder 50 taken along the VIb-VIb line. In FIGS. 6A and 6B, a part of the tool holder 50 is cross-sectioned and the length in the axial direction is roughly shown.

The tool holder 50 is to transmit a rotary power of the machining tool to the thread forming tap 40 by maintaining the shank 21 on the machining tool and holding the thread forming tap 40 in the chuck 22 and, as shown in FIGS. 6A and 6B, holes 22c and 22d are formed in the chuck 22.

The holes 22c and 22d are parts through which an engaging pin 60 described below passes and, as shown in FIGS. 6A and 6B, are respectively formed as circular through-holes penetrating the outside and the hollow section 22a of the chuck 22 and also are formed symmetrically to each other relative to a shaft line O2.

The engaging pin 60 is a part to restrict the relative rotation of the thread forming tap 40 with respect to the tool holder 50 by engaging with the engaging groove 11b of the thread forming tap 40 (refer to FIG. 4), and is formed by an axial member with approximately the same diameter as that of the holes 22c and 22d. The engaging pin 60 is undetachably fixed in the chuck 22 by caulking both ends thereof when inserted in the holes 22c and 22d. Also, as described above, since the holes 22c and 22d are disposed symmetrically to each other relative to the shaft line O2, the engaging pin 60 passing through the holes 22c and 22d are disposed perpendicular to the shaft line O2.

Here, when engaging the engaging pin 60 and the engaging groove 11b of the thread forming tap 40 with each other, it is possible to engaging the engaging pin 60 with the engaging groove 11b easily simply by inserting the thread forming tap 40 while rotating it at about 180 degrees.

With the shrink-fit tool unit 30 configured as described above, since the cylindrical terminal area 11 of the thread forming tap 40 has the engaging groove 11b and the chuck 22 (hollow section 22a) has the engaging pin 60 to engage with the engaging groove 11b, when the cylindrical terminal area 11 of the thread forming tap 40 is inserted into the chuck 22 (hollow section 22a), the engaging groove 11b and the engaging pin 60 are engaged with each other to restrict the relative rotation of the thread forming tap 40 with respect to the tool holder 50. As a result, even when the cutting resistance receiving from a work piece is large, the thread forming tap 40 can be securely held without causing a slip between the thread forming tap 40 and the tool holder 50.

Since the engaging groove 11b and the engaging pin 60 are engaged with each other simply by inserting the cylindrical terminal area 11 of the thread forming tap 40 into the chuck 22 (hollow section 22a), even when the machining load receiving from a work piece act peripherally in both the forward and reverse directions, it is possible to increase the transmission of rotary power without causing a slide between the thread forming tap 40 and the tool holder 50.

Also, since the engaging groove 11b of the thread forming tap 40 is disposed symmetrically relative to the axis O1 of the cylindrical terminal area 11, as compared with a case where it is disposed at an offset position relative to the axis O1, for example, the direction of inserting the thread forming tap 40 into the chuck 22 (hollow section 22a) of the tool holder 50 is not limited to one direction but at least two directions are possible, thus making it possible to improve the workability.

Furthermore, since the engaging groove 11b of the thread forming tap 40 is disposed symmetrically relative to the axis O1, the configuration of the thread forming tap 40 and the tool holder 50 can be simplified and thereby the manufacture cost can be reduced.

In addition, with this embodiment, since the engaging groove 11b is disposed on the side of the cylindrical terminal area 11 of the thread forming tap 40, the area where the thread forming tap 40 and the tool holder 50 are shrink-fitted, namely a shrink-fit area, can be increased as compared with a case where the thread forming tap 40 is formed on the cylindrical terminal area 11, and thereby the grip force of the tool holder 50 for the thread forming tap 40 can be increased.

When an internal thread is formed by plastic-deforming a work piece, the machining load of the thread forming tap 40 receiving from the work piece is especially large and the machining load acts peripherally both in the forward and reverse, directions. Even in such a situation, it is possible to increase the transmission of rotary power effectively by holding the thread forming tap 40 securely without causing a slip relative to the tool holder 50.

Next, a shrink-fit tool unit 70 according to a third embodiment will be described. The shrink-fit tool units 1 and 30 of the first and second embodiments are configured to hold the tool holders 20 and 50 directly on the machining tool, but the shrink-fit tool unit 70 of the third embodiment is configured to hold a tool holder 90 on the machining tool by means of a collet or the like. That is, the shrink-fit tool unit 70 acts as a throwaway tool. Because of this, the tool cost can be reduced by forming only the end of a cutting part with hard metal or the like. The same parts as those in the first and second embodiments are denoted by the same numerals and not described.

Figure 7:
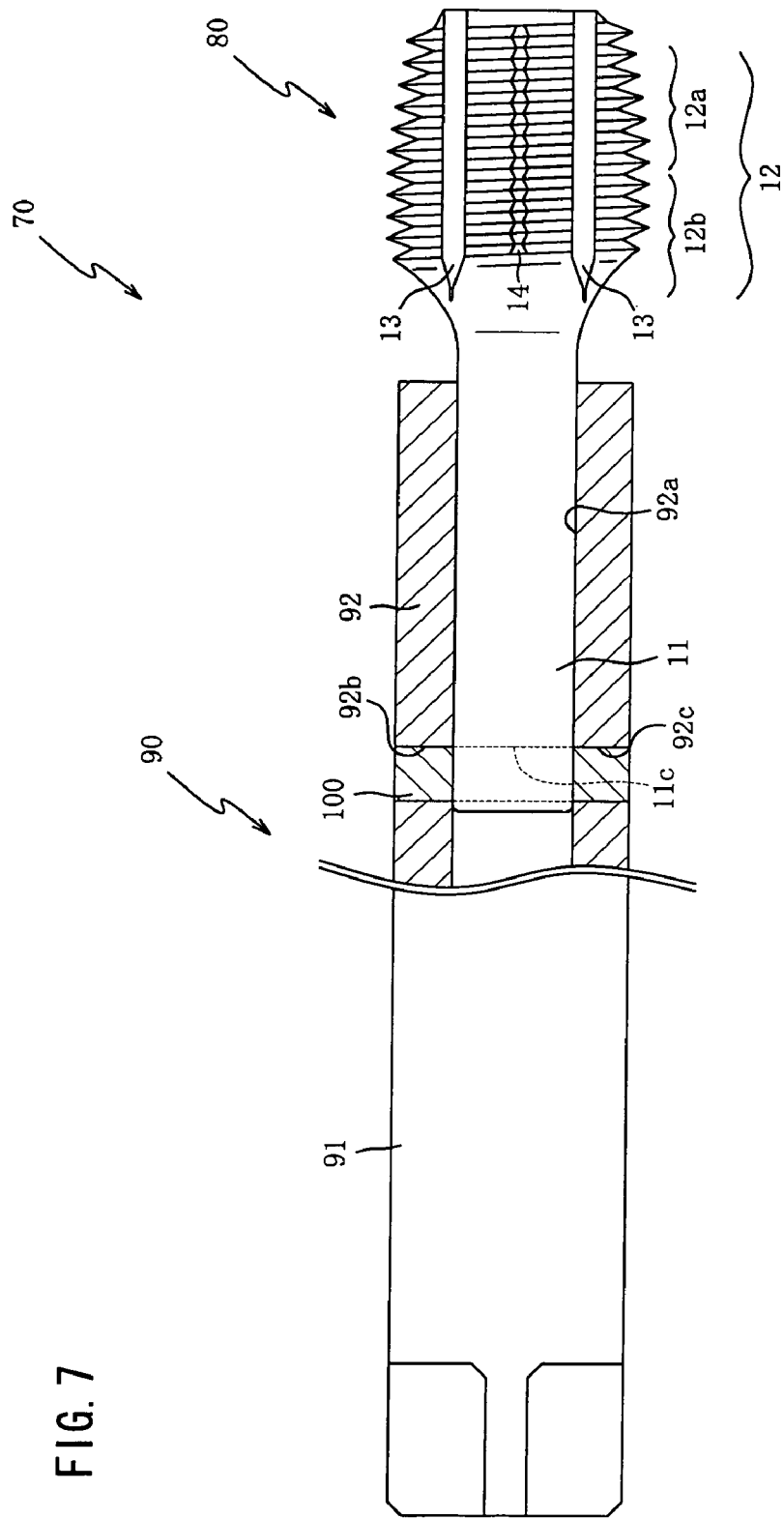
FIG. 7 is a front view of the shrink-fit tool unit according to a third embodiment of the present invention.

FIG. 7 is a front view of the shrink-fit tool unit 70 according to the third embodiment of the present invention. FIG. 7 shows the state where a thread forming tap 80 is maintained in a tool holder 90. In FIG. 7, a part of the tool holder 90 is cross-sectioned and also the length in axial direction is roughly shown.

The shrink-fit tool unit 70, as shown in FIG. 7, includes a thread forming tap 80 and a tool holder 90, wherein the thread forming tap 80 is maintained in the tool holder 90 by shrink-fitting the cylindrical terminal area 11 of the thread forming tap 80 in the chuck 92 of the tool holder 90, and also the relative rotation of the thread forming tap 80 with respect to the tool holder 90 can be restricted by engaging the engaging groove 11c and the engaging pin 100 with each other.

Figures 8A, 8B:
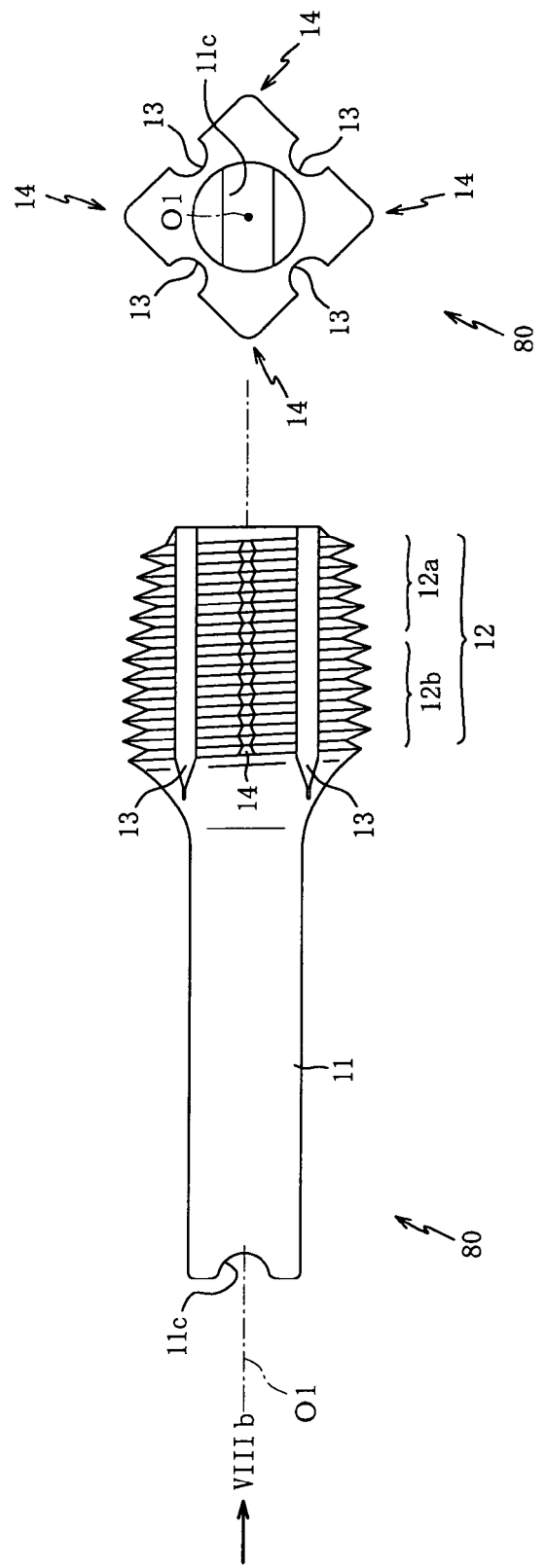
FIG. 8A is a front view of the thread forming tap and FIG. 8B is a side view of the thread forming tap as seen from the arrow VIIIb direction.

Next, the detailed configuration of the thread forming tap 80 is described with reference to FIGS. 8A and 8B. FIG. 8A is a front view of the thread forming tap 80 and FIG. 8B is a side view of the thread forming tap 80 seen from the arrow VIIIb direction.

The thread forming tap 80 is a tool to form an internal thread in the pilot hole (not shown) of a work piece by providing rotary power of the machining tool (not shown) to the cylindrical terminal area 11 through the tool holder 90 and, as shown in FIGS. 8A and 8B, the engaging groove is concavely formed on the side (on the left side in FIG. 8A) of the cylindrical terminal area 11.

The engaging groove 11c is a section to restrict the relative rotation of the thread forming tap 80 with respect to the tool holder 90 by using an engaging pin 100 of the tool holder 90 described below and, as shown in FIGS. 8A and 8B, is configured as a concave groove formed with half circular cross-section and is disposed symmetrically relative to the axis O1 by matching the center the engaging groove 11c with the axis O1.

Also, with this embodiment, the diameter of the engaging groove 11c formed with half circular cross-section is set to 50% of the diameter of the cylindrical terminal area 11. Because of this, it is possible to increase the contact area with the engaging pin 100 by forming the engaging groove 11c with half circular cross-section and also setting the diameter thereof to 50% of the diameter of the cylindrical terminal area 11, and thereby the stress due to the machining load receiving a work piece can be distributed to secure the strength of the thread forming tap 80. It is preferable to set the diameter of the engaging groove 11c to 50% or more of the diameter of cylindrical terminal area.

Figures 9A, 9B:
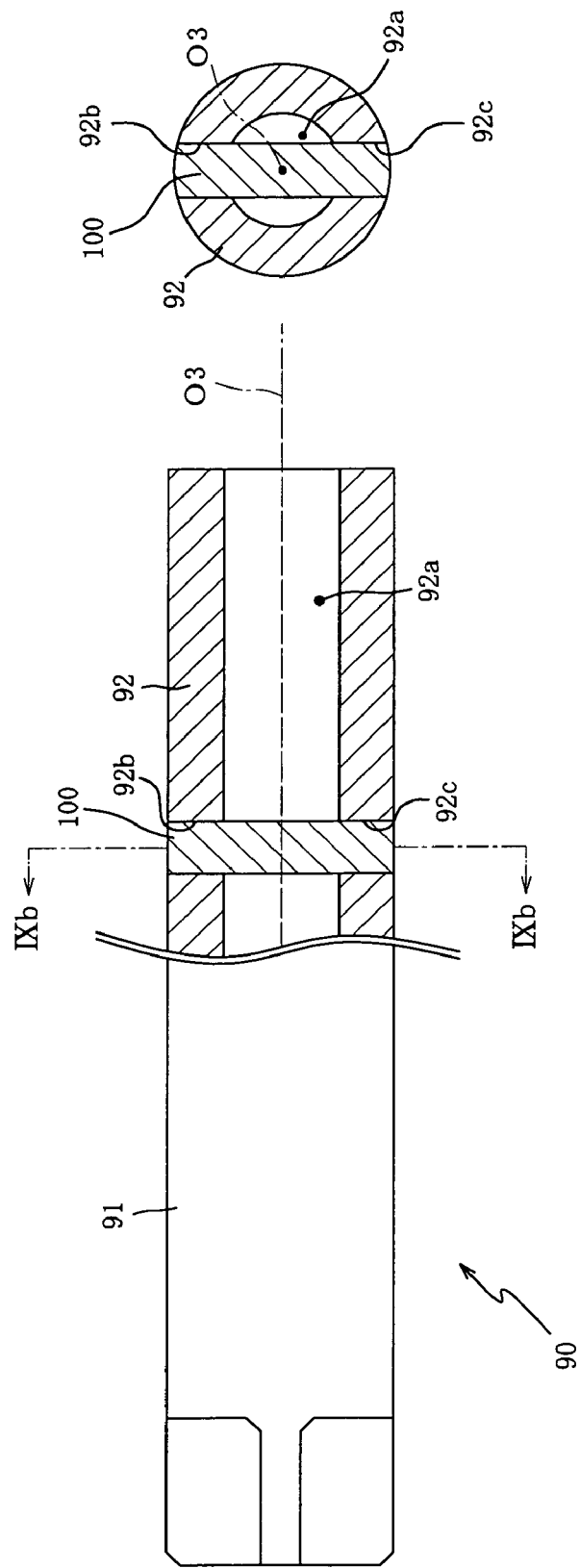
FIG. 9A is a front view of the tool holder and FIG. 9B is a cross-sectional view thereof taken along the IXb-IXb line in FIG. 9A.

Now, the detailed configuration of the tool holder 90 is described with reference to FIGS. 9A and 9B. FIG. 9A is a front view of the tool holder 90 and FIG. 9B is a cross-sectional view of the tool holder 90 taken along the IXb-IXb line in FIG. 9A. In FIGS. 9A and 9B, a part of the tool holder 90 is cross-sectioned and the length in the axial direction is roughly shown.

The tool holder 90, as shown in FIGS. 9A and 9B, includes a shank 91 and the chuck 92 coupled to the shank 91, and is to transmit rotary power of the machining tool to the thread forming tap 80 by holding the shank 91 by means of a collet or the like and also holding the thread forming tap 80 in the chuck 92.

The shank 91 is a part to maintain the tool holder 90 on the machining tool by means of a collet or the like and, as shown in FIG. 9A, is formed into a column with the axis O3.

The chuck 92 is a part to hold the thread forming tap 80 by shrink-fit and, as shown in FIG. 9A, a hollow section 92a is provided in the hollow with the axis thereof matched with the axis O3, and also the holes 92b and 92c are formed.

The hollow section 92a is a section (refer to FIG. 7) to insert the cylindrical terminal area 11 into the thread forming tap 80, and is formed so that the diameter thereof is smaller than the diameter of the cylindrical terminal area 11 of the thread forming tap 80 at a normal temperature. Also, when the chuck 92 is heated, the diameter thereof is increased due to heat expansion and thereby the cylindrical terminal area 11 of the thread forming tap 80 can be inserted. When the chuck 92 is cooled with the cylindrical terminal area 11 of the thread forming tap 80 being inserted, the diameter thereof is reduced due to heat contraction and thereby the thread forming tap 80 can be held undetachably.

The holes 92b and 92c are sections through which to pass the engaging pin 100 described below and, as shown in FIGS. 9A and 9B, are respectively formed as through holes with circular cross-section penetrating into the outside of the chuck 92 and the hollow section 92a and also are formed symmetrically to each other relative to the shaft line O3.

The engaging pin 100 is a member to restrict the relative rotation of the thread forming tap 80 with respect to the tool holder 90 by using the engaging groove 11c of the thread forming tap 80 (refer to FIG. 7), and is formed with an axial-shaped member with approximately the same diameter as the diameter of the holes 92b and 92c. The engaging pin 100 is fixed undetachably by caulking both ends thereof when inserted in the holes 92b and 92c. Also, as described above, since the holes 92b and 92c are formed symmetrically relative to the shaft line O3, the engaging pin 100 is disposed perpendicular to the shaft line O3.

Here, when engaging the engaging pin 100 with the engaging groove 11c of the thread forming tap 80, it is possible to achieve this procedure easily simply by inserting the engaging pin 100 while rotating the thread forming tap 80.

With the shrink-fit tool unit 70 configured as described above, since the cylindrical terminal area 11 has the engaging groove 11c and the chuck 92 (hollow section 92a) of the tool holder 90 has the engaging pin 100 to engage with the engaging groove 11c, when the cylindrical terminal area 11 of the thread forming tap 80 is inserted into the chuck 92 (hollow section 92a), the engaging groove 11c and the engaging pin 100 are engaged with each other to restrict the relative rotation of the thread forming tap 80 with respect to the tool holder 90. As a result, even when the cutting resistance receiving from a work piece is large, the thread forming tap 80 can be maintained securely without causing a slip between the thread forming tap 80 and the tool holder 90.

Also, since the engaging groove 11c and the engaging pin 100 are configured to engage with each other simply by inserting the cylindrical terminal area 11 of the thread forming tap 80 into the chuck 92 (hollow section) of the tool holder 90, even when the machining load receiving from a work piece acts peripherally both in the forward and reverse directions, the transmission of rotary power can be improved without causing a slip between the thread forming tap 80 and the tool holder 90.

Furthermore, since the engaging groove 11c of the thread forming tap 80 is disposed symmetrically relative to the axis O1 of the cylindrical terminal area 11, as compared with a case where the engaging groove 11c is disposed at an offset position relative to the axis O1, for example, the direction of inserting the thread forming tap 80 into the chuck 92 (hollow section 92a) of the tool holder 90 is not limited to one direction, but at least two directions are possible and thereby the workability can be improved.

Also, since the engaging groove 11c of the thread forming tap 80 is formed symmetrically relative to the axis O1 of the cylindrical terminal area 11, the configuration of the thread forming tap 80 and the tool holder 90 can be simplified and thereby the manufacture cost can be reduced.

In addition, with this embodiment, since the engaging groove 11c is formed on the side of the cylindrical terminal area 11 of the thread forming tap 80, the area where the thread forming tap 80 and the tool holder 90 are shrink-fitted, namely the shrink-fit area, can be increased as compared with a case where it is formed on the raised terminal area 11 of the thread forming tap 80, the grip force of the tool holder 90 for the thread forming tap 80 can be increased.

When an internal thread is formed by plastic-deforming a work piece, the machining load of the thread forming tap 80 receiving from the work piece is especially large, and consequently the machining load acts peripherally both in the forward and reverse directions. Even in such a situation, the thread forming tap 80 is securely held without causing a slip relative to the tool holder 90.

Now, a shrink-fit tool unit 110 of a fourth embodiment will be described with reference to FIG. 10. The shrink-fit tool unit 70 of the third embodiment is configured to restrict the relative rotation of the thread forming tap 80 with respect to the tool holder 90 by engaging the engaging groove 11c concavely formed on the thread forming tap 80 with the engaging pin 100 formed on the tool holder 90. In contrast, the shrink-fit tool unit 110 of the fourth embodiment is configured to restrict the relative rotation of the thread forming tap 10 with respect to the tool holder 120 by engaging the first engaging part 11a convexly formed on the thread forming tap 10 with an engaging screw 130 disposed on the tool holder 120. The same parts as those in the first, second, and third embodiments are denoted by the same numerals and not described. Also, the thread forming tap 10 of this embodiment is the same tool as the thread forming tap 10 of the first embodiment.

Figure 10:
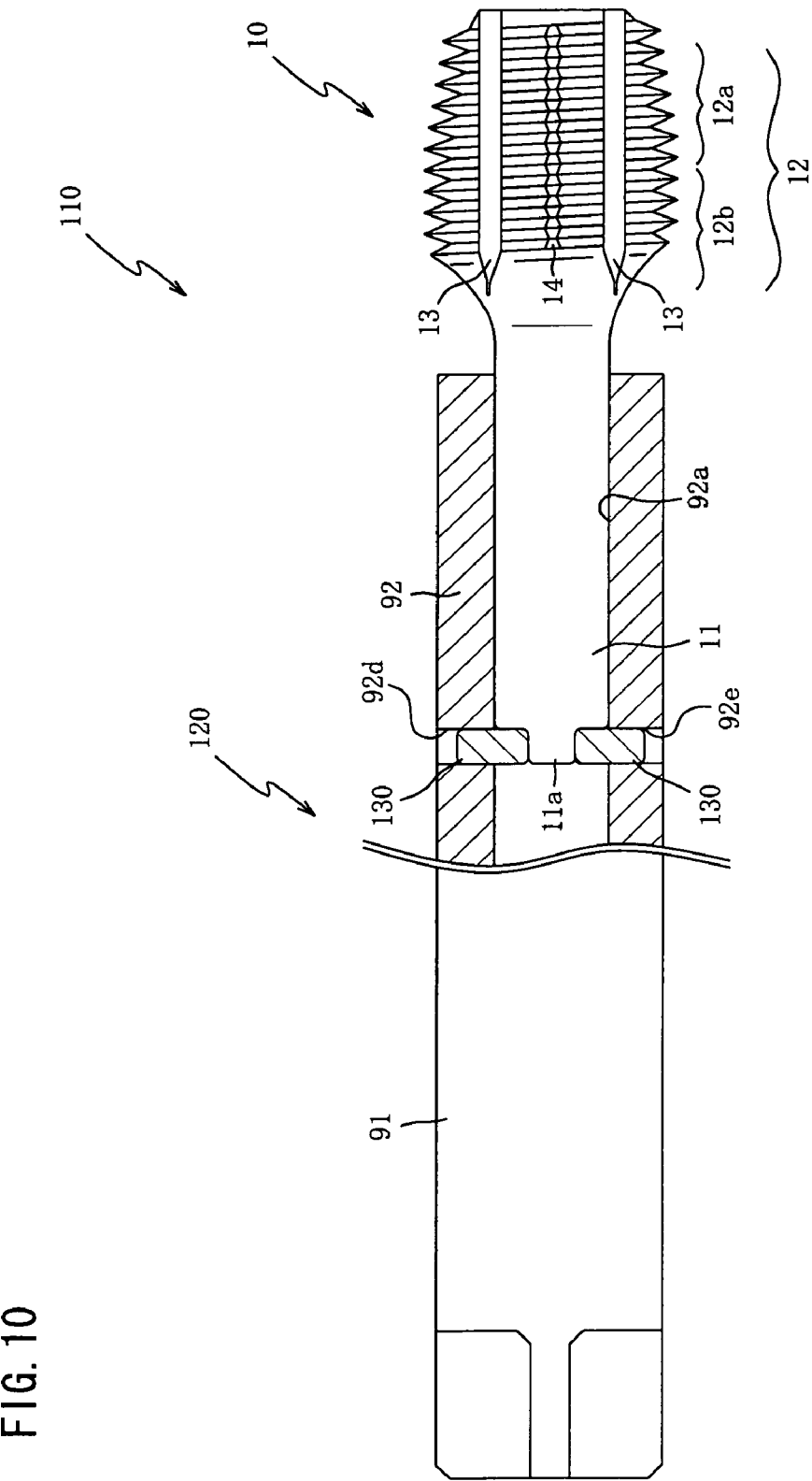
FIG. 10 is a front view of the shrink-fit tool unit according to a fourth embodiment of the present invention.

FIG. 10 is a front view of the shrink-fit tool unit 110 according to the fourth embodiment of the present invention. FIG. 10 shows the state where the thread forming tap 10 is maintained in the tool holder 120. In FIG. 10, a part of the tool holder 120 is cross-sectioned and the length in axial direction is roughly shown.

The shrink-fit tool unit 110, as shown in FIG. 10, includes the thread forming tap 10 and the tool holder 120, and is configured to be able to restrict the relative rotation of the thread forming tap 10 with respect to the tool holder 120 by shrink-fitting the cylindrical terminal area 11 of the thread forming tap 10 in the chuck 92 to hold the thread forming tap 10 in the tool holder 120 and also by engaging the first engaging part 11a and the engaging screw 130 with each other.

Next, the detailed configuration of the tool holder 120 will be described with reference to FIGS. 11A and 11B. FIG. 11A is a front view of the tool holder 120 and FIG. 11A is a cross-sectional view of the tool holder 120 taken along the XIb-XIb line of FIG. 11A. In FIGS. 11A and 11B, a part of the tool holder 120 is cross-sectioned and the length in axial direction is roughly shown.

The tool holder 120 is to transmit the rotary power of the machining tool to the thread forming tap 10 by holding the shank 91 on the machining tool by means of a collet or the like and also holding the thread forming tap 10 in the chuck 92 and, as shown in FIGS. 11A and 11B, threads 92d and 92e are formed in the chuck 92.

The threads 92d and 92e are sections to spirally insert an engaging screw 130 described below and, as shown in FIGS. 11A and 11B, they are respectively configured as spirally drilled through holes with circular cross-section and also disposed symmetrically relative to the shaft line O3.

The engaging screw 130 is a setscrew to restrict the relative rotation of the thread forming tap 10 with respect to the tool holder 120 by engaging with the first engaging part 11a of the thread forming tap 10 (refer to FIG. 10), and on the engaging screw 130, male screws corresponding to the threads 92d and 92e are formed with an axial member disposed on the peripheral surface. The engaging screw 130 is spirally inserted into the threads 92d and 92e to be fixed in the chuck 92. Also, as described above, since the threads 92d and 92e are disposed symmetrically relative to the shaft line O3, the engaging screw 130 is disposed perpendicular to the shaft line O3. In this embodiment, the engaging screw 130 is a setscrew with a hexagonal hole.

Here, when engaging the engaging screw 130 with the first engaging part 11a of the thread forming tap 10, it is possible to engage the engaging screw 130 with the first engaging part 11a easily simply by inserting the engaging screw 130 while rotating it.

With the shrink-fit tool unit 110 configured as described above, since the cylindrical terminal area 11 of the thread forming tap 10 has the first engaging part 11a and the chuck 92 (hollow section) of the tool holder 120 has the engaging screw 130 to engage with the first engaging part 11a, when the cylindrical terminal area 11 of the thread forming tap 10 is inserted into the chuck 92 (hollow section 92a) of the tool holder 120, the first engaging part 11a and the engaging screw 130 are engaged with each other to restrict the relative rotation of the thread forming tap 10 with respect to the tool holder 120. As a result, even when the cutting resistance receiving from a work piece is large, the thread forming tap 10 can be held securely without causing a slip between the thread forming tap 10 and the tool holder 120.

Also, since the first engaging part 11a and the engaging screw 130 are configured to engage with each other simply by inserting the cylindrical terminal area 11 of the thread forming tap 10 into the chuck 92 (hollow section 92a) of the tool holder 120, even when the machining load receiving from a work piece acts peripherally both in the forward and reverse directions, transmission of the rotary power can be improved without causing a slide between the thread forming tap 10 and the tool holder 120.

Also, since the first engaging part 11a of the thread forming tap 10 is formed symmetrically relative to the axis O1 of the cylindrical terminal area 11, as compared with a case where the first engaging part 11a is formed at an offset position relative to the axis O1, for example, the direction of inserting the thread forming tap 10 into the chuck 92 (hollow section 92a) of the tool holder 120 is not limited to one direction, but at least two directions are possible and thereby the workability can be improved.

Furthermore, since the first engaging part 11a of the thread forming tap 10 is disposed symmetrically relative to the axis O1 of the cylindrical terminal area 11, the configuration of the thread forming tap 10 and the tool holder 120 can be simplified and thus the manufacture cost can be reduced.

In addition, with this embodiment, since the engaging screw 130 of the tool holder 120 is spirally inserted into the threads 92d and 92e to fix in the chuck 92, it is possible to minimize the rattling of the thread forming tap 10 in a circumferential direction with respect to the tool holder 120 by screwing the engaging screw 130 after shrink-fitting the cylindrical terminal area 11 of the thread forming tap 10 with the chuck 92 of the tool holder 120. As a result, a further improvement in the transmission of rotary power can be achieved.

Also, even when the machining load of the thread forming tap 10 receiving from a work piece is especially large and the machining load acts peripherally both in the forward and reverse directions because an internal thread is formed by plastic-deforming the work piece, the thread forming tap 10 is securely held without causing a slip relative to the tool holder 120 and thereby the transmission of rotary power can be improved effectively.

In this embodiment, although the nominal diameter of the engaging screw 130 is set so as to correspond to the first engaging part 11a of the thread forming tap 10, in order to increase the restriction of the relative rotation of the thread forming tap 10 with respect to the tool holder 120, the nominal diameter of the engaging screw 130 may be further increased. In this case, it is preferable to alter the shape of the first engaging part 11a so that the entire end surface of the engaging screw 130 contacts the first engaging part 11a.

The present invention describe above is not limited to the above-mentioned embodiments, but it can be readily inferred that various modifications are possible within the scope and spirit of the present invention.

For example, in the first embodiment, although the case is described where the first engaging part 11a of the thread forming tap 10 is an approximate rectangle as seen from the front and the side and configured as a columnar projection and the second engaging part 22b of the tool holder 20 is configured as a concave groove which engages with the first engaging part 11a, the first engaging part 11a and the second engaging part 22b are not necessarily limited to such configurations, and for example, it is possible to configure the first engaging part 11a as a triangle columnar projection formed in an equilateral triangle as seen from the side and also to configure the second engaging part 22b as a concave groove to engage with the first engaging part 11a.

Thus, when engaging the first engaging part 11a with the second engaging part 22b, it is possible to engage the first engaging part 11a with the second engaging part 22b easily by inserting the thread forming tap 10 while rotating it at about 120 degrees. That is, since the direction of inserting the thread forming tap 10 into the chuck 22 (hollow section 22a) of the tool holder 20 increases to three directions and thereby a further workability improvement can be achieved.

Also, in the second embodiment, although the case is described where the engaging groove 11b of the thread forming tap 40 is configured as a concave groove 1 formed in an approximate rectangle as seen from the front and the side, the configuration is not necessarily limited to this, but for example, it is possible to add a concave groove that is formed in an approximate rectangle as seen from the front and the side and crosses the concave groove 1 at right angle.

Accordingly, when engaging the engaging groove 11b with the engaging pin 60, it is possible to engage the engaging groove 11b with the engaging pin 60 easily by inserting it while rotating. That is, since the direction of inserting the thread forming tap 40 into the chuck 22 (hollow section 22a) of the tool holder 50 increases to four directions, a further workability improvement can be achieved.

Also, in the first embodiment, the case is described where the first engaging part 11a of the thread forming tap 10 is configured as a columnar projection formed in an approximate rectangle as seen from the front and the side, the configuration is not necessarily limited to this, but for example, it is possible to configure it as a columnar projection formed in an approximate trapezoid as seen from the front and an approximate rectangle as seen from the side.

Thus, it is possible to curb the rattling of the thread forming tap 10 in the circumferential direction relative to the tool holder 20, and also the first engaging part 22b and the second engaging part 22b can be easily engaged with each other when inserting the thread forming tap 10 into the chuck 22 (hollow section 22a) of the tool holder 20.

Also, in the second embodiment, although the case is described where the engaging groove 11b of the thread forming tap 40 is configured as a concave groove formed in an approximate rectangle as seen from the front and the side, the configuration is not necessarily limited to this, but for example, it is possible to configure it as a concave groove formed in an approximate trapezoid as seen from the front and an approximate rectangle as seen from the side.

This makes it possible to curb the rattling of the thread forming tap 40 in the circumferential direction relative to the tool holder 50, and also the engaging groove 11b and the engaging pin 60 with each other easily when inserting the thread forming tap 40 into the chuck 22 (hollow section 22a) of the holder 50.

The invention claimed is:

1. A shrink-fit tool unit comprising a rotary tool having a cylindrical terminal area which is formed in a cylindrical shape having an axis and a tool holder having a chuck in which a hollow section is provided so that the cylindrical terminal area of the rotary tool can be inserted in, the rotary tool being maintained in the tool holder by shrink-fitting the cylindrical terminal area of the rotary tool into the chuck of the tool holder, wherein:
the rotary tool is a thread forming tap including a cutting part provided at an end of the cylindrical terminal area and has a margin section projecting radially to form an internal thread by plastic-deforming a work piece;
the cylindrical terminal area has a first engaging part which is formed on a side of the cylindrical terminal area and formed approximately rectangle as seen from the axis of the cylindrical terminal area;
the first engaging part is disposed symmetrically relative to the axis of the cylindrical terminal area by matching a center thereof with the axis of the cylindrical terminal area, and each sides of the rectangle shape is lengthened to the direction which the margin projects;
the tool holder has a second engaging part that is formed in the chuck to engage with the first engaging part where the second engaging part is formed approximately rectangle shape as seen from an axis of the chuck to engage with the first engaging part and is disposed symmetrically relative to the axis of the chuck; and
the relative rotation of the thread forming tap held in the tool holder is restricted with respect to the tool holder, even when machining load receiving from a workpiece acts both in forward and reverse circumferential directions, by engaging the first engaging part and the second engaging part with each other when the cylindrical terminal area of the thread forming tap is inserted in the chuck.

2. The shrink-fit tool unit according to claim 1, wherein:
a section between the cylindrical terminal area and the cutting part is formed radially enlarged in the direction from the cylindrical terminal area to the cutting part;
the cylindrical terminal area of the thread forming tap is shrink-fitted to the chuck of the tool holder while the cutting part is not in contact with the chuck;
the first engaging part is a projection convexly formed on the side of the cylindrical terminal area and the second engaging part is a groove concavely formed on the back end of hollow section; and
the bottom of the concave groove of the second engaging part is formed in shape along with the projection of the first engaging part to be in contact with the projection of the first engaging part.

3. The shrink-fit tool unit according to claim 1, wherein:
a section between the cylindrical terminal area and the cutting part is formed radially enlarged in the direction from the cylindrical terminal area to the cutting part;
the cylindrical terminal area of the thread forming tap is shrink-fitted to the chuck of the tool holder while the cutting part is not in contact with the chuck;
the first engaging part is an engaging groove concavely formed on the side of the cylindrical terminal area and the second engaging part is an axial member undetachably fixed in the chuck when inserted in holes formed in the chuck and are penetrating the outside and the hollow section of the chuck and are formed symmetrically to each other relative to the axis of the chuck; and
the bottom of the engaging groove of the first engaging part is formed in shape along with the axial member to be in contact with the axial member of the second engaging part.

4. The shrink-fit tool unit according to claim 1, wherein:
the first engaging part is a projection convexly formed on the side of the cylindrical terminal area and the second engaging part is an engaging screw spirally inserted in holes formed in the chuck and are penetrating the outside and the hollow section of the chuck and are spirally formed symmetrically to each other relative to the axis of the chuck; and
the engaging screws are disposed perpendicular to the axis of the chuck and pinch the projection symmetrically relative to the axis of the chuck.

5. The shrink-fit tool unit according to claim 1, wherein the tool holder is held on a machining tool by means of a collet.

* * * * *